Aug. 14, 1956   H. G. BECK   2,758,853
JOURNAL BOX SEAL
Filed Nov. 7, 1952   2 Sheets-Sheet 1

INVENTOR
Howard G. Beck
BY Evans + McCoy
ATTORNEYS

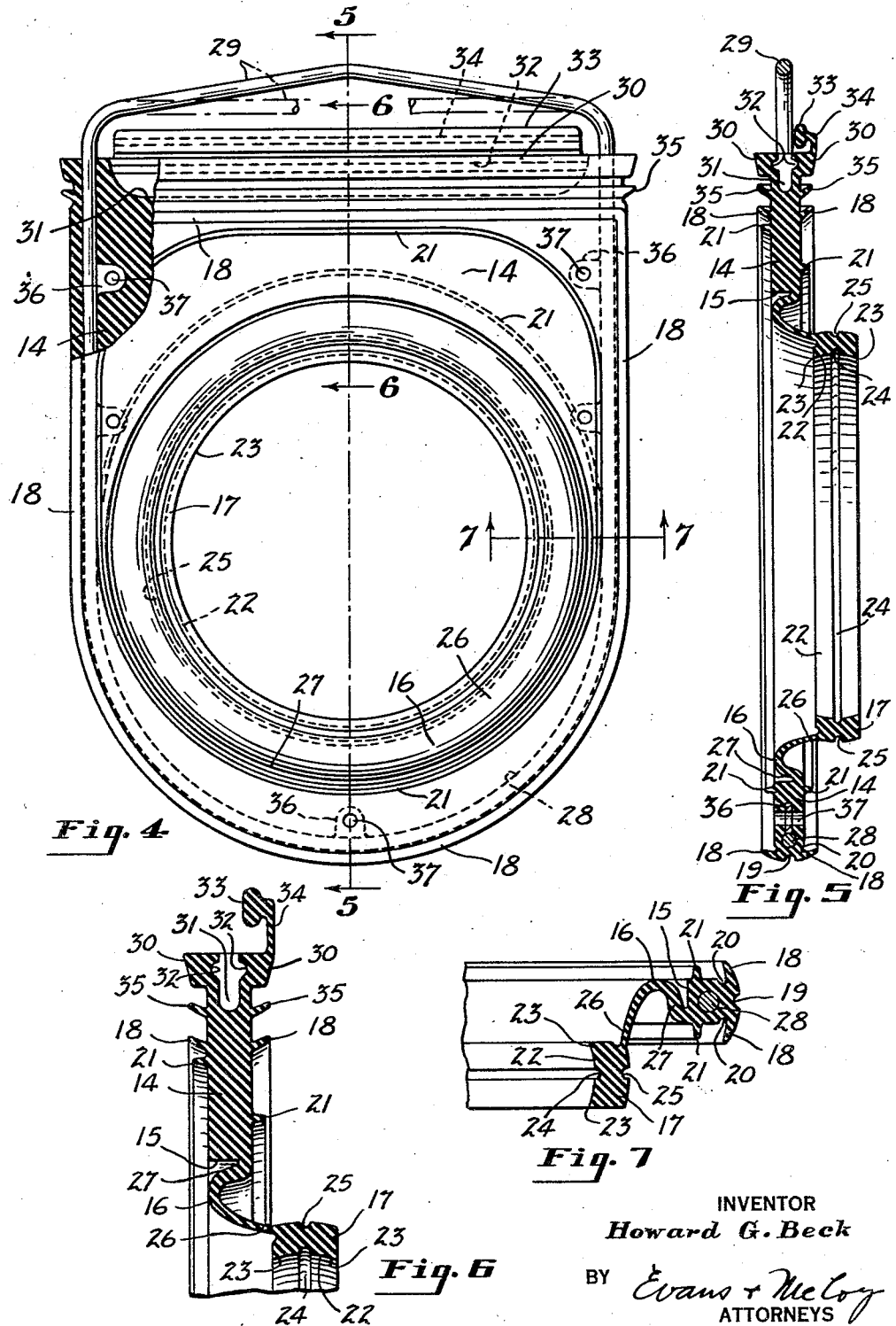

United States Patent Office 2,758,853
Patented Aug. 14, 1956

2,758,853

JOURNAL BOX SEAL

Howard G. Beck, Akron, Ohio, assignor to The General Tire and Rubber Company, Akron, Ohio, a corporation of Ohio Application November 7, 1952, Serial No. 319,280

5 Claims. (Cl. 286—6)

This invention relates to seals for railway car journal boxes and more particularly to a seal for excluding dust, dirt and moisture from the inner end of the journal box and preventing leakage of lubricant from the journal box.

The seal of the present invention is a molded member of elastic oil resistant rubber or synthetic rubber composition that is formed to have sealing engagement with the journal box walls and provides a closure member for the inner end of the journal box and that has a flexible central portion provided with an axle receiving opening around which an axle engaging sealing ring is formed, the flexible central portion of the sealing member being so formed that it yieldably supports the sealing ring for limited axial movements and for free radial movements with the axle within the journal box.

The sealing member has a marginal portion formed for sealing engagement with the journal box walls and is provided with means for locking the sealing member in place in the box.

Objects of the invention are to provide an improved axle engaging seal, to provide an improved seal between the sealing member and journal box walls, and to provide improved means for securing the sealing member in place in the journal box and for releasing it from the journal box.

Reference should be had to the accompanying drawings forming a part of this specification in which:

Fig. 4 is a rear elevation of the sealing member;

Fig. 5 is a section taken on the line indicated at 5—5 in Fig. 4;

Fig. 6 is a fragmentary section corresponding to that shown in Fig. 5, showing the upper portion of the seal on an enlarged scale; and Fig. 7 is a transverse section taken on the line indicated at 7—7 in Fig. 5.

Figure 1:
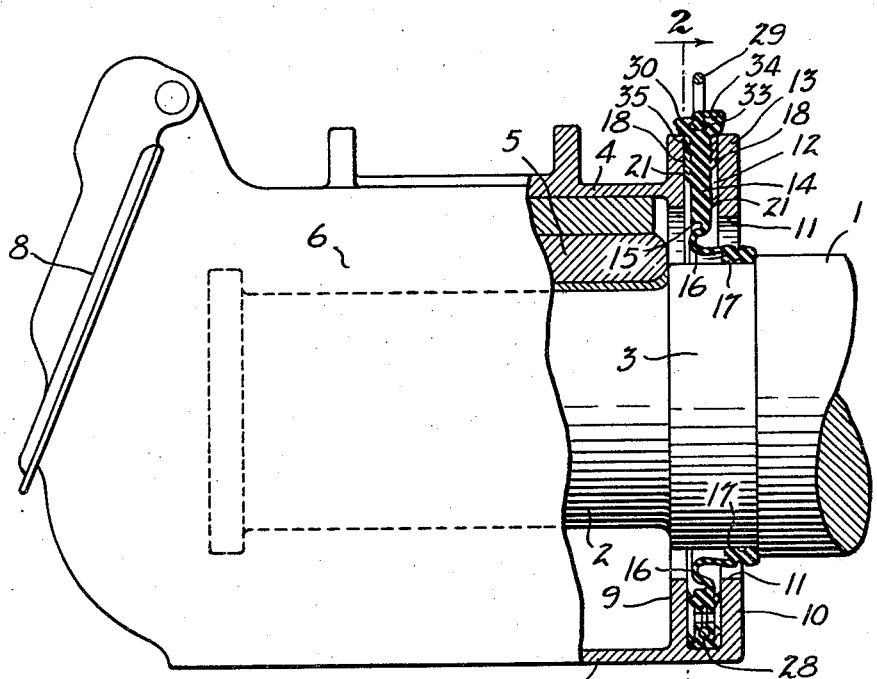
Figure 1 is a side elevation of a railway car journal box with the inner portion of the journal box broken away to show the sealing means of the present invention applied thereto.
Figure 2:
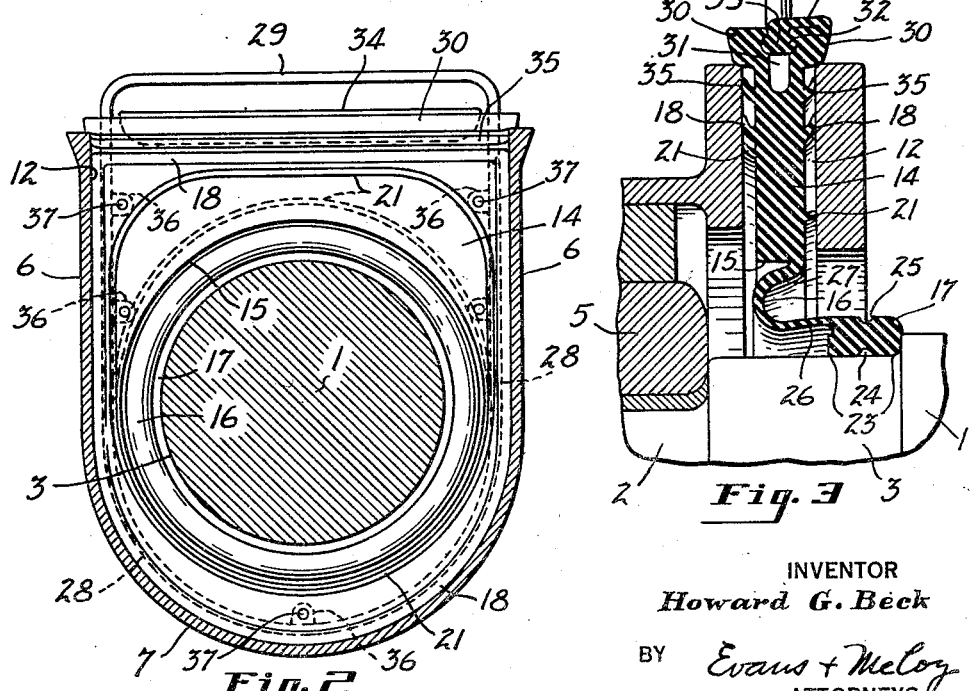
Fig. 2 is a vertical section taken on the line indicated at 2—2 in Fig. 1.
Figure 3:
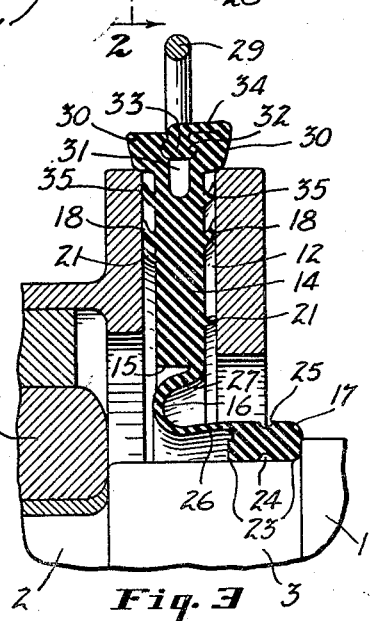
Fig. 3 is a fragmentary section corresponding to that shown in Fig. 1, showing the upper portion of the sealing member on an enlarged scale.

In the accompanying drawings the invention is shown applied to a railway car journal box of conventional construction that is supported on the end of an axle 1 that is provided with a reduced cylindrical bearing portion 2 and a cylindrical seal engaging portion 3 of somewhat larger diameter than the cylindrical portion 2 and disposed inwardly of the bearing portion 2. The journal box through which the weight of the car is imposed upon the axle has a top load carrying wall 4 that rests on bearing blocks 5 that are supported on the bearing portion 2 of the axle. The journal box has vertical side walls 6 and a rounded bottom 7. The outer end of the journal box is closed by suitable means such as a lid 8 and its inner end is open to receive the axle.

Adjacent the inner end thereof the journal box has spaced internal ribs 9 and 10 that extend entirely around the interior of the box. The ribs 9 and 10 define a substantially circular opening 11 at the inner end of the journal box and the channel formed by the ribs 9 and 10 registers with a slot 12 across the top 4 that is formed in a wide upwardly projecting rib 13 at the inner end of the top wall.

The journal box axle assembly above described is conventional. The present invention resides in means cooperating with the journal box and axle to seal the inner end of the journal box against the entry of dust or moisture to the box and to seal the rear end of the box against escape of lubricant. The seal is in the form of a molded elastic rubber sealing member having a relatively stiff marginal body portion 14 that is of a thickness less than the width of the slot 12 and of the channel between the ribs 9 and 10, the body 14 having a circular internal shoulder 15 that is disposed substantially concentric with the axle when the journal box and seal are assembled on the axle.

Inwardly of the shoulder 15 the sealing member has a flexible annular web 16 that is integrally joined at its outer edge to the body 14 and that is integrally joined to a sealing ring 17 at its inner edge. The sealing ring 17 is substantially concentric with the shoulder 15 and of a width to enter through the slot 12 when the sealing member is inserted into the journal box through the slot 12. The marginal edge of the body 14 conforms to the side walls 6 and bottom 7 at the bottom of the channel between the ribs 9 and 10, the side and bottom edges of the body 14 being U-shaped in contour to conform to the interior of the journal box. The U-shaped margin of the sealing member has oppositely projecting flanges 18 that form a marginal edge that is normally wider than the receiving slot and channel. The flanges 18 are bent inwardly and confined between the sides of the receiving channel and the opposed faces of the body 14 when the sealing member is moved into place through the slot 12 and, in order to increase the flexibility of the flanges 18, the body 14 is provided with a groove 19 centrally of its outer edge that extends throughout the U-shaped wall engaging margin thereof. The body 14 is also provided with grooves 20 in its opposite faces immediately adjacent the flanges 18. Grooves 19 and 20 increase the flexibility of the flanges 18 and permit them to be bent to a greater angle with respect to the body 14 and, in order to facilitate the entry of the sealing member into the slot 12, the flanges 18 are so formed that their outer faces converge outwardly so as to present oppositely inclined faces for engagement with the opposite edges of the slot 12 when the sealing member is inserted therethrough. As the sealing member is forced through the slot the flanges 18 are progressively folded inwardly against the side faces of the body 14 to form a seal throughout the extent of the channel in which the sealing member is seated. To provide an additional seal the body 14 is provided with additional circumferentially continuous ribs 21 that engage the opposed faces of the ribs 9 and 10.

The sealing ring 17 is provided with an inner concave face 22 that provides bearing edges 23 of the same diameter at the inner and outer edges of the ring. In order to permit flexing of the ring it is provided with central internal and external circumferential grooves 24 and 25 that serve to lessen the transverse rigidity of the ring so as to permit the ring to flex about its central portion when it is stretched around the portion of the axle with which it engages. The inner groove 24 also provides a lubricant retaining cavity and the groove 25 may serve as a seat for a spring band if it is desired to increase the pressure of the ring on the journal. As shown in Figs.

5, 6, and 7, the rounded concave face 22 gradually increases in diameter from the bearing edges 23 to the margins of the groove 24 when the sealing ring 17 is in its normal unstressed condition.

The ring 17 is axially inwardly offset with respect to the body 14 and the web 16 connecting the body 14 to the sealing ring 17 has a thin flexible inner portion 26 that is integrally joined to the axially outer edge of the ring 17. The web 16 is outwardly bowed so that the inner portion 26 thereof and its outer portion 27 are both tapered at a small angle to the axis of the axle. The thickness of the web 16 gradually increases from its inner to its outer edge so that the portion 27 thereof is relatively stiff while the inner portion 26 which is relatively thin and wider than the outer portion 27 is readily flexible radially of the axle axis. By reason of the small angle of taper of the inner portion 26 of the web, the web offers greater resistance to axial movements of the ring 17 than to radial movements thereof. The ring 17 is of a width to pass through the slot 12 and the web 16 is sufficiently flexible to permit portions of the ring 17 to be shifted into alinement with the body portion 14 of the sealing member while the ring is passing through the slot 12.

To lock the sealing member in place in the journal box and to conveniently remove it from the journal box, a metal reinforcing ring 28 is provided that is shaped to conform to the interior of the journal box and that is embedded in the body portion 14 closely adjacent the U-shaped margin thereof. The ring 28 has a bail portion 29 above the top of the seal that extends across the space between the vertical portions of the ring and that is bendable downwardly from the position shown in full lines in Fig. 4 to the position shown in dotted lines in Fig. 4 to exert a lateral thrust against the upright portions of the ring to press them outwardly toward the side walls of the journal box and clamp the marginal portions of the sealing member against the side walls 6. The bail 29 provides a handle by means of which the sealing member can be lifted from the journal box and an upward pull on the bail tends to bend it upwardly and pull the upright portions of the ring away from the side wall 6 and release the sealing member.

At the top thereof the sealing member has laterally extending flanges 30 that engage with the top of the ribs 13. To hold the flanges 30 in snug engagement with the ribs 13, the sealing member has an elongated recess 31 that extends across the major portion of the length of the top edge and that has an enlarged portion 32 between the flanges 30 to receive a wedge member 33 that serves to spread the top edge of the sealing member and press the flanges 30 against the top of the rib 13. The wedge member 33 may be formed integrally with the sealing member and joined thereto by a flexible web 34 joined to one of the flanges 30 along its outer edge. The wedge 33 is normally supported above the top of the sealing member and, after the sealing member is inserted in the journal box, it can be swung downwardly and inserted into engagement with the enlarged portion 32 of the recess 31. Transversely extending sealing ribs 35 may be provided on opposite sides of the body 14 below the flanges 30 for engagement with opposite sides of the slot 12.

To enable the reinforcing ring 28 to be accurately positioned in the sealing member it is provided with spaced positioning lugs 36 that project inwardly and that are each provided with an aperture 37 and these apertures are adapted to receive positioning pins in a mold that serves to hold the ring in proper position during the molding and vulcanizing operations.

The ribs 9 and 10 and the slot 12 provide circumferentially continuous opposed walls between which the sealing member has wedging engagement to form an effective seal throughout the perimeter of the sealing member so that an effective sealing closure is provided between the journal box walls and the axle at the open inner end of the journal box.

It is to be understood that in accordance with the provisions of the patent statutes, variations and modifications of the specific devices herein shown and described may be made without departing from the spirit of the invention.

What I claim is:

1. In a journal box that has a top wall, vertical side walls, an arcuate bottom wall, an open inner end, an internal channel adjacent its inner end that extends downwardly from the top wall across the side and bottom walls and a slot in the top wall that registers with said channel, the improvement which comprises: an elastic rubber sealing member that fits in said channel and forms an end closure, said sealing member having a flexible central portion provided with an axle receiving opening and a relatively rigid body portion surrounding said central portion and having endless oppositely projecting flanges forming a U-shaped margin that conforms to and closely overlies the bottom of said channel, said body portion being of a thickness less than the width of said channel, said flanges being folded inwardly toward the body portion and confined between the sides of said channel and the side faces of said body portion, said body portion having a groove between said flanges extending the full length of said margin centrally thereof and grooves in its side faces alongside said flanges and extending the full length thereof to increase the flexibility of said flanges, said flanges having slanting radially outwardly converging outer faces at said U-shaped margin to facilitate entry of said marginal edge into said slot, said outer faces extending axially from the sides of said first-mentioned groove to the ends of said flanges.

2. In a journal box that has a top wall, vertical side walls, an arcuate bottom wall, an open inner end, an internal channel adjacent its inner end that extends downwardly from the top wall across the side and bottom walls and a slot in the top wall that registers with said channel, the improvement which comprises: an elastic rubber sealing member that fits in said channel and forms an end closure, said sealing member having a flexible central portion provided with an axle receiving opening and a relatively rigid body portion surrounding said central portion and having a U-shaped margin that conforms to the bottom of said channel, a metal reinforcing ring having a U-shaped portion embedded in said body portion of the sealing member and positioned close to said margin, said ring having a continuous bail portion above the top of said sealing member that extends across the top of said U-shaped portion, said bail portion being upwardly arched and bendable downwardly to spread the top of said U-shaped portion to lock the sealing member in said channel and upwardly to release said sealing member from the channel.

3. In a journal box that has a top wall, vertical side walls, an arcuate bottom wall, an open inner end, an internal channel adjacent its inner end that extends downwardly from the top wall across the side and bottom walls and a slot in the top wall that registers with said channel, the improvement which comprises: an elastic rubber sealing member that fits in said channel and forms an end closure, said sealing member having a flexible central portion provided with an axle receiving opening and a relatively rigid body portion surrounding said central portion and having a U-shaped margin that conforms to the bottom of said channel, said body having lateral flanges at the top thereof that engage with the top of said journal box on opposite sides of said slot, the top portion of said body having a centrally disposed recess extending throughout the major portion of its length and extending below said flanges, and an elongated wedge member engaging in said recess to spread the top portion of said body within said slot.

4. In a journal box that has a top wall, vertical side walls, an arcuate bottom wall, an open inner end, an internal channel adjacent its inner end that extends downwardly from the top wall across the side and bottom walls and a slot in the top wall that registers with said channel, the improvement which comprises: an elastic rubber sealing member that fits in said channel and forms an end closure, said sealing member having a flexible central portion provided with an axle receiving opening and a relatively rigid body portion surrounding said central portion and having a U-shaped margin that conforms to the bottom of said channel, said body having lateral flanges at the top thereof that engage with the top of said journal box on opposite sides of said slot, the top portion of said body having a centrally disposed recess extending throughout the major portion of its length and extending below said flanges, and an elongated wedge member engaging in said recess to spread the top portion of said body within said slot, said wedge member being integral with said body and joined to said body by a flexible web integral with said wedge member and with one of said flanges.

5. A one-piece molded elastic rubber seal for railway car journal boxes comprising a relatively stiff axle-receiving sealing ring, a relatively stiff body of a form to fit the interior of a journal box and offset axially outwardly with respect to said ring, said body surrounding said ring and being spaced radially outwardly therefrom, a flexible web closing the space between said body and said ring, said web being bowed outwardly and having radially inner and outer portions that are integrally joined to said ring and said body and that are disposed at small angles to the axis of said ring, said inner portion of said web being relatively thin so as to offer slight resistance to radial movements of said ring with respect to said body and being joined to the axially and radially outer edge portion of said ring, said web gradually increasing in thickness from its inner to its outer portion whereby it offers substantial resistance to axial movements of said ring with respect to said body, said sealing ring when in the normal unstressed condition having axially-spaced internal edges of substatnially the same diameter and a rounded transversely-concave axle-engaging face extending between said internal edges, a circumferential internal groove at the center of said concave face and spaced from said internal edges, said concave face gradually increasing in radius between said end edges and the margins of said internal groove, and a circumferential external groove in the outer portion of said ring concentric to and aligned with the internal groove, said grooves being circumferentially continuous and facilitating relative flexing of the axially inner and outer portions of the ring.

References Cited in the file of this patent

UNITED STATES PATENTS

| | | |
|---|---|---|
| 589,211 | Loesewitz | Aug. 31, 1897 |
| 1,712,003 | Hubbard | May 7, 1929 |
| 2,088,180 | Stevens | July 27, 1937 |
| 2,177,441 | Pesarese | Oct. 24, 1939 |
| 2,181,203 | Reynolds | Nov. 28, 1939 |
| 2,257,119 | Johannesen | Sept. 30, 1941 |
| 2,487,669 | Pattullo et al. | Nov. 8, 1949 |
| 2,598,094 | Augereau | May 27, 1952 |
| 2,607,966 | Beck | Aug. 26, 1952 |
| 2,635,907 | Heimbuch | Apr. 21, 1953 |
| 2,668,067 | Fitzsimmons | Feb. 2, 1954 |
| 2,692,783 | Foss | Oct. 26, 1954 |

FOREIGN PATENTS

| | | |
|---|---|---|
| 562,456 | Great Britain | July 3, 1944 |